A. W. BARNARD.
AUTOMATIC WEIGHING SCALE.
APPLICATION FILED SEPT. 11, 1916.
1,222,917.
Patented Apr. 17, 1917.
2 SHEETS—SHEET 1.
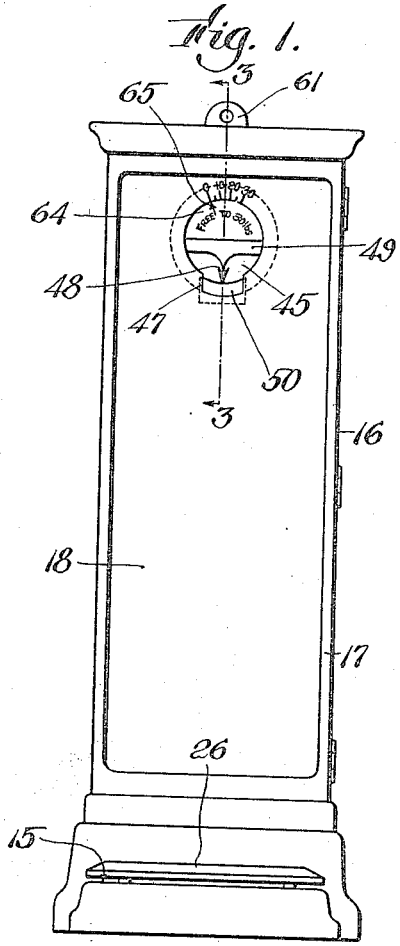
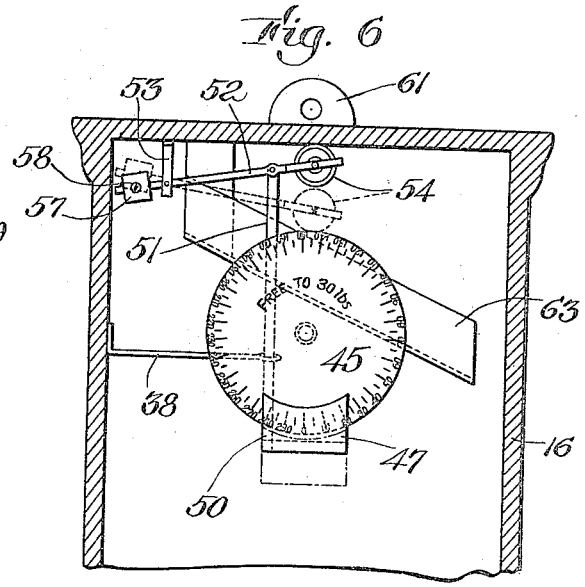
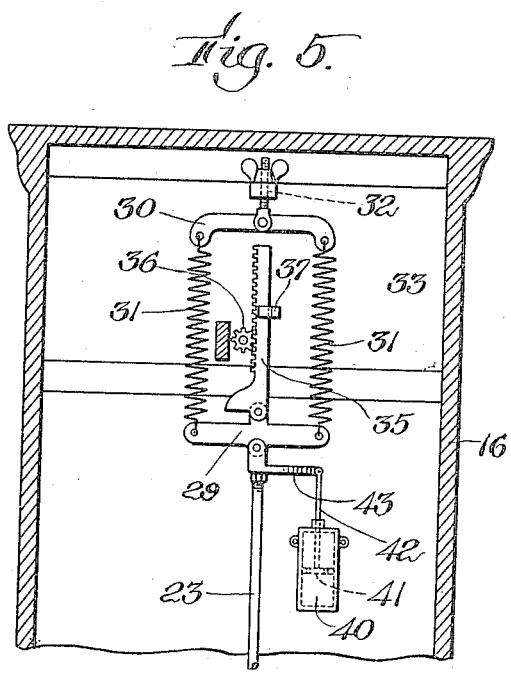
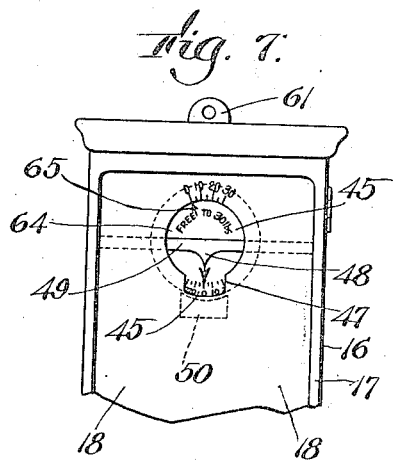
Inventor:
Arthur W. Barnard
By Francis J Wakin
Attorney.

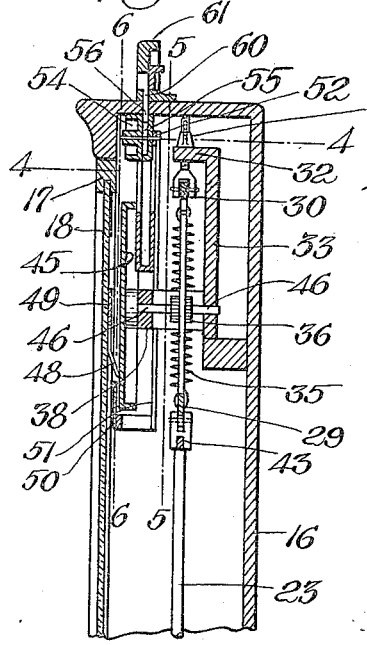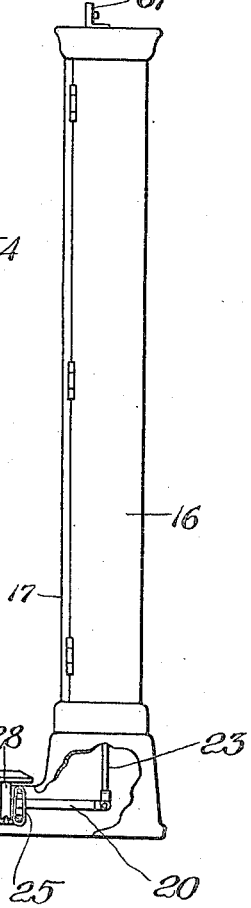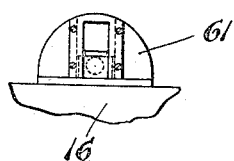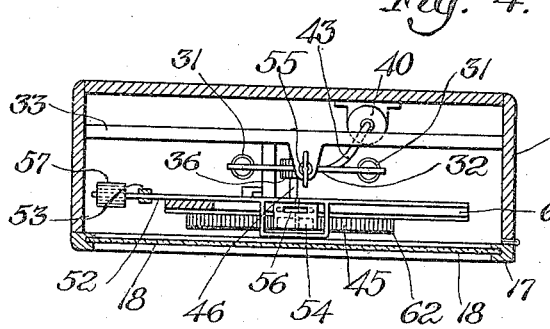

UNITED STATES PATENT OFFICE.

ARTHUR W. BARNARD, OF NEWTON CENTER, MASSACHUSETTS, ASSIGNOR, BY DIRECT AND MESNE ASSIGNMENTS, TO COLONIAL SCALE COMPANY, OF BOSTON, MASSACHUSETTS, A CORPORATION OF MASSACHUSETTS.

AUTOMATIC WEIGHING-SCALE.

1,222,917.      Specification of Letters Patent.      Patented Apr. 17, 1917.

Original application filed July 15, 1915, Serial No. 40,121. Divided and this application filed September 11, 1916. Serial No. 119,397.

*To all whom it may concern:*

Be it known that I, ARTHUR W. BARNARD, a citizen of the United States, residing at Newton Center, in the county of Middlesex and State of Massachusetts, have invented a new and useful Improvement in Automatic Weighing-Scales, of which the following is a specification, reference being had therein to the accompanying drawings.

This invention relates to a coin-operated automatic weighing scale, and is a division of an application filed by me in the United States Patent Office, July 15, 1915, Serial No. 40121.

It is desirable in scales of this character, which are generally installed in stores and public places, that a certain free service should be given in order that the public may be given the privilege, without charge, of weighing children, and various small parcels.

The object of this invention is to provide a device whereby free weighing to a limited extent may be assured without affecting the operation or usefulness of the scale.

Another object is to secure this result without the addition of complicated mechanism, and without adding to the weighing mechanism.

Other objects of this invention will be more specifically set forth and described hereinafter.

In the accompanying drawings illustrating the preferred form of my invention as applied to an automatic weighing scale such as is shown in my application hereinbefore referred to, Figure 1 is a front elevation of an automatic weighing scale constructed and operated in accordance with my invention; Fig. 2 is a side elevation of the same with the base portion of the casing cut away to show the weighing lever mechanism; Fig. 3 is a vertical central sectional view on line 3—3 in Fig. 1 looking from right to left; Fig. 4 is a horizontal sectional view on line 4—4 in Fig. 3 looking downwardly; Fig. 5 is a sectional view on line 5—5 in Fig. 3 looking from left to right and showing the upper portion of the weighing mechanism in elevation; Fig. 6 is a sectional view on line 6—6 in Fig. 3 looking from left to right and showing the dial and coin-operated means for disclosing the weight indicated; Fig. 7 is a front elevation of the upper portion of the scale showing the dial exposed as opposed to Fig. 1 where the dial is shown as concealed; Fig. 8 is a side elevation of the dial and coin roll; Fig. 9 is a front elevation of the coin roll and a portion of the dial, both of said Figs. 8 and 9 showing the coin roll in engagement with the dial; and Fig. 10 is a detail view of the coin slot.

In the drawings illustrating one application of my invention is shown an automatic weighing scale in which the weighing parts of the scale are of well known construction and are inclosed in a casing having a base 15 and an upright portion 16 provided with a hinged door 17 covering the front of the upright portion, said door being preferably provided with a mirror 18 having in its upper portion a circular opening to expose the dial. Within the base of the casing, referring to Fig. 2, are mounted the scale levers, consisting of a long lever 20 and a short lever 21. The long lever is supported at its forward end by a link 22 which is in turn supported by a knife edge bearing secured to the base 15 and at its rear end the lever 20 is connected to steelyard 23. The short lever 21 is connected at its forward end to the long lever 20 by a link 24 and at its rear end by link 25 to the casing 15. The two levers support a scale platform 26 having a forward bearing 27 resting on the long lever and a rear bearing 28 resting on the short lever. At all points of contact knife edge bearings of usual construction are provided.

The steelyard 23 is pivotally connected at its upper end to a draft-bar 29 which is connected to a spring hanger 30 by helical springs 31. The spring hanger is pivotally supported by an adjustable screw 32 in a bracket 33 fastened to the casing 16. Upon the draft-bar is pivotally mounted an upright rack-bar 35 held in engagement with a pinion 36 by a guide bracket 37. The pinion carries a dial 45. In order to reduce the vibration of the scale mechanism a dashpot may be provided comprising a cylinder 40 to hold the oil or other fluid, having a piston 41 and a piston rod 42 which is connected by an arm 43 to the steelyard.

The operation of this portion of the scale is well known and may be described briefly as follows: A person desiring to be weighed steps upon the platform 26, which depresses the steelyard 23 through the medium of the levers 20 and 21 the downward movement of the steelyard being opposed by the tension of the springs 31. As the steelyard is depressed, carrying down the draft-bar 29 and the rack-bar 35, the pinion 36 is turned, rotating the dial and denoting the weight. By regulating the adjusting screw 32 the zero point may be adjusted in correct position.

The indicating means comprises a dial 45 mounted on the shaft 46 of the pinion 36 and provided with suitable markings around its edge to denote weight. The door 17 as hereinbefore stated, is provided with an opening through which the dial is visible (see Figs. 1 and 7) but said opening is not of sufficient size to expose the markings on the dial except at one place 47 where the door is cut away for this purpose. A pointer 48 carried by a support 49 is fixed in position to indicate the weight shown by the rotary dial when a weight is placed on the scale platform and the pointer is directed to the cut away portion 47 where the markings of the dial are exposed to view.

In order to conceal the weight indicated by the pointer and dial until a coin has been dropped into the machine a movable part or shutter 50 normally covers and conceals the markings on the dial at and adjacent to the pointer in the cut away portion 47 and is moved aside to expose the markings on the dial by coin-operated means. Any such means may be provided and one form is shown in the drawings, in which the shutter 50 is carried by a rod 51 moving through a guide rod 38 and mounted on a balanced lever 52 pivotally supported by a depending bracket 53 fastened to the top of the casing 16. On one end of the lever is loosely mounted a coin-roll 54 having a cavity 55 adapted to hold a coin and having an opening 56. A counter-balancing weight 57 is slidably mounted on the other end of the lever 52 and may be held in any adjusted position by a set screw 58. The counter-balancing weight is so adjusted that it is just sufficient to counter-balance the combined weights of the shutter and the coin-roll and to keep the coin-roll in an elevated position as shown in full lines in Fig. 6. In this position the coin-roll is in engagement with the top of the casing 16 (see Fig. 3) and its opening 56 is in alinement with a slot 60 of a coin receiver 61 fastened on the top of the machine.

In the operation of the scale the shutter 50 is normally in a position to conceal the weight indicated by the pointer 48 and the dial. A person desiring to be weighed on the scale steps up on the platform 26 which depresses the scale levers and the steelyard 23 and turns the dial 45 through the medium of the rack-bar 35 and pinion 36 so that as soon as the weighing mechanism comes to a rest, the vibration being reduced by the dash-pot 40, the weight is indicated by the pointer and the dial but remains concealed. At that point the person drops a coin in the receiver 61 which passes through the slot 60 into the coin-roll 54 and the lever 52, being sensitively balanced by the counter-weight 57 the weight of the coin overcomes the weight of the counter-balance and causes the lever 52 to drop until the coin roll 54 comes into engagement with the edge of the dial, as shown by dotted outline in Fig. 6. The edge of the dial is preferably provided with a flange 62 to increase the friction between the roll and the dial when the two are in engagement. As the coin-roll drops under the weight of the coin, the lever 52 carries with it the rod 51 and shutter 50, thus dropping the shutter and exposing the reading on the dial as shown in Fig. 7. So long as the weight upon the scale platform remains substantially constant and there is no movement of the dial, the parts of the coin-operated means remain in the position last described and the reading on the dial is exposed. If, however the weight on the scale platform is changed so as to turn the dial an appreciable distance, either by the person stepping off the scale platform or in an attempt to weigh a second person before the dial returns to zero point, the rotation of the dial rotates the coin-roll and when the opening 56 in the coin-roll is turned downwardly, the coin rolls out and falls into a coin-chute 63 and thence into a bag or any other suitable coin receptacle, not shown. As soon as the coin leaves the coin-roll, the counter-balance 57 immediately causes the lever 52 and coin-roll to be elevated again into position shown in full lines in Fig. 6, thus raising the shutter and again concealing the reading on the dial. The amount of movement necessary to accomplish this result is comparatively small and may be regulated to some extent by increasing or decreasing the diameter of the coin-roll. Very little friction between the coin-roll and the flange on the dial is required to effect this result because as the coin-roll is turned by the friction between it and the dial, the coin within rolls and remains in a lowermost position until the opening in the coin-roll reaches its lowermost position when the coin falls out. It will be seen, therefore, that any attempt to weigh more than one person on one coin must necessarily result in a movement of the dial sufficient to discharge the coin and, therefore, conceal the reading on the dial and prevents the attainment of the object sought.

By having the weighing mechanism entirely independent of the coin-operated means for disclosing the weight shown on the dial, it becomes possible to provide the scale with auxiliary markings for the purpose of permitting of a limited free weighing. This is an important feature because these scales are generally installed in public places and any service they can give without charge, such as the weighing of children or light bundles, increases their commercial value. To accomplish this result the dial is preferably provided with an arrow 64 and the front door of the scale is provided with markings 65 running from zero up to the limit of free weight, for instance, thirty pounds, and these markings are at all times exposed to view so that if any object weighing thirty pounds or less is placed upon the scale platform, the movement of the dial, due to that weight, is exposed to view and the weight will be indicated up to the limit by the movement of the pointer 64 marked on the dial.

It is to be understood that my invention is not to be limited to the exact construction herein shown and described and is not to be limited to any particular form of automatic weighing scales since, with slight modifications apparent to one skilled in the art, it may be adapted to various forms of automatic weighing scales all within the purview of the invention.

What I claim is:—

1. The combination with a coin-operated automatic weighing scale in which the weight indicated is normally concealed until a coin is deposited of means for giving a free reading of weight to a limited extent; said means comprising a limited scale and a pointer coöperating therewith; both being at all times visible and one being movable and actuated by the weighing mechanism and the other being fixed.

2. The combination with a coin-operated automatic weighing scale in which the weight indicated is normally concealed until a coin is deposited of means for giving at all times a free reading of weight to a limited extent.

3. The combination with a coin-operated automatic weighing scale having a rotary dial and in which the weight indicated is normally concealed until a coin is deposited of means for giving at all times a free reading of weight to a limited extent.

4. The combination with a coin-operated automatic weighing scale having a rotary dial and in which the weight indicated is normally concealed until a coin is deposited of means for giving at all times a free reading of weight to a limited extent; said means comprising a limited scale and a pointer coöperating therewith, both being at all times visible and one being on said rotary dial and the other being on a fixed part of the scale.

In testimony whereof, I hereunto set my hand this the twenty-fifth day of August, 1916.

ARTHUR W. BARNARD.

Copies of this patent may be obtained for five cents each, by addressing the "Commissioner of Patents, Washington, D. C."